No. 821,295. PATENTED MAY 22, 1906.
F. KARR.
SPRING SUPPORT.
APPLICATION FILED MAR. 23, 1905.
3 SHEETS—SHEET 1.
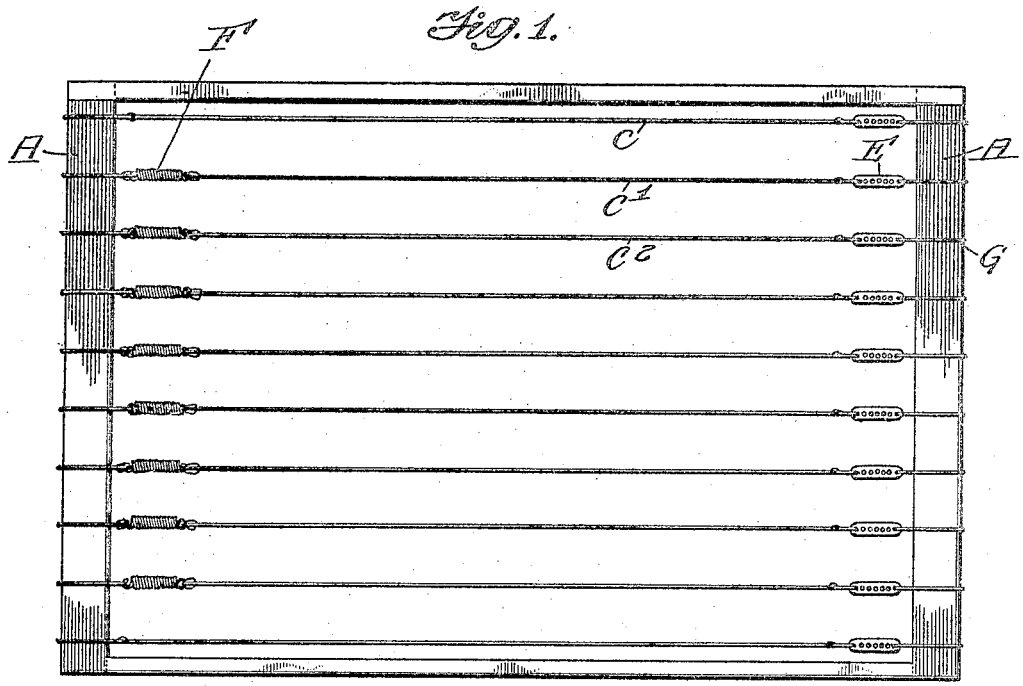
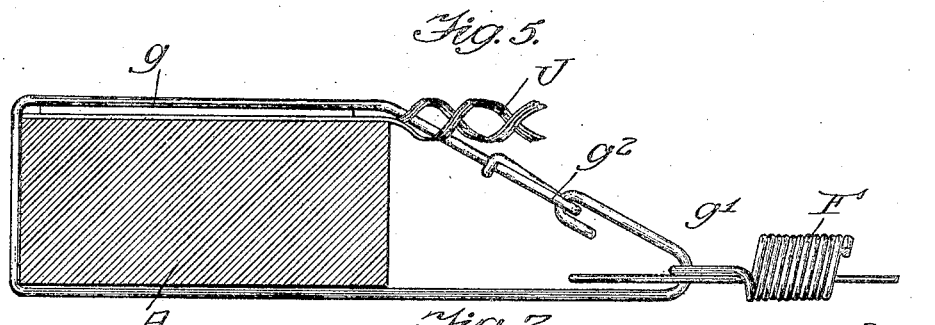
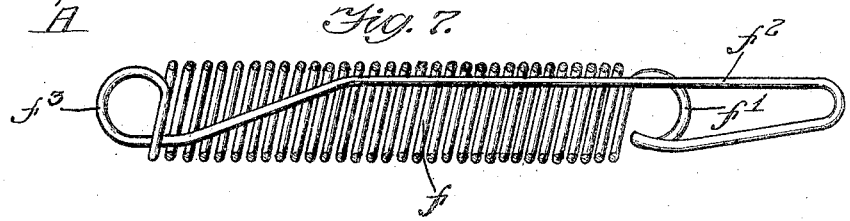

No. 821,295. PATENTED MAY 22, 1906.
F. KARR.
SPRING SUPPORT.
APPLICATION FILED MAR. 23, 1905.
3 SHEETS—SHEET 2.
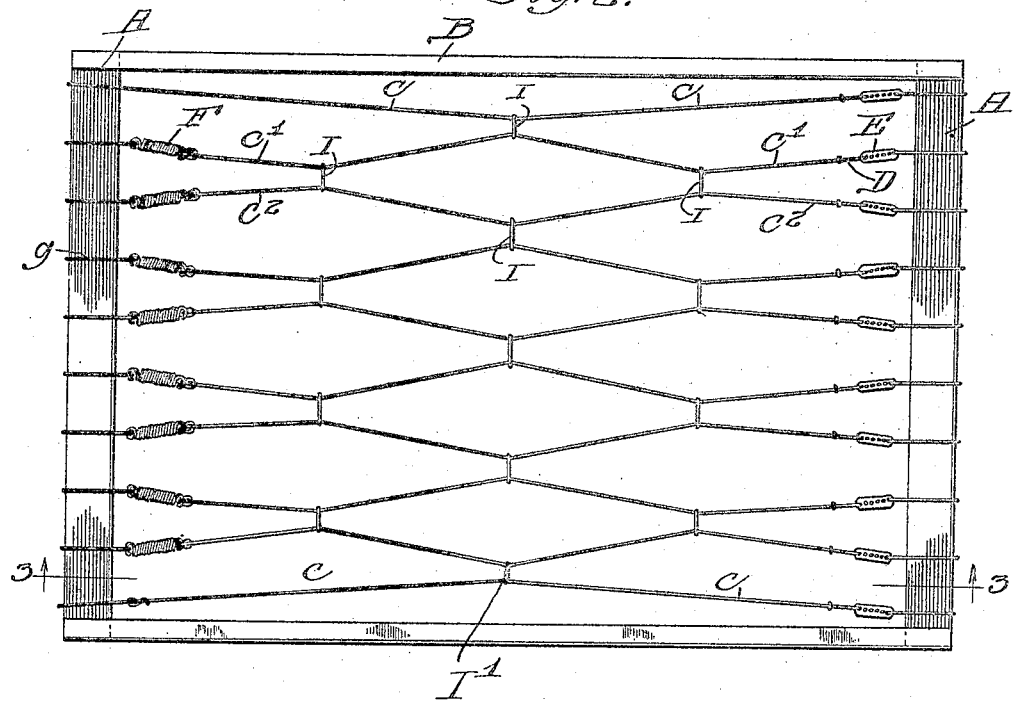
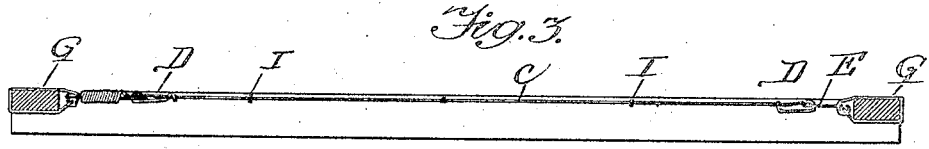
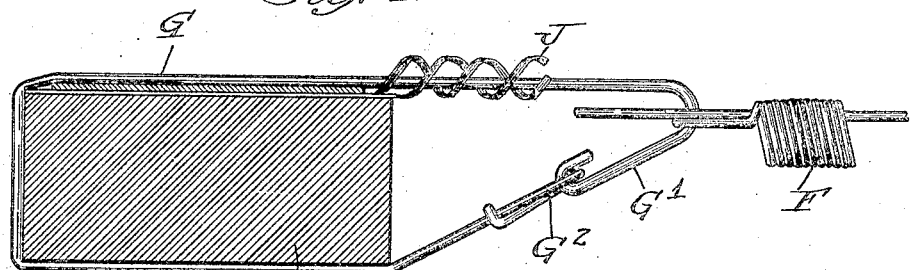
Witnesses:
J. B. Weir
Robert H. Weir
Inventor:
Francis Karr, by
Raymond Barnett
his attorney No. 821,295. PATENTED MAY 22, 1906.
F. KARR.
SPRING SUPPORT.
APPLICATION FILED MAR. 23, 1905.
3 SHEETS—SHEET 3.
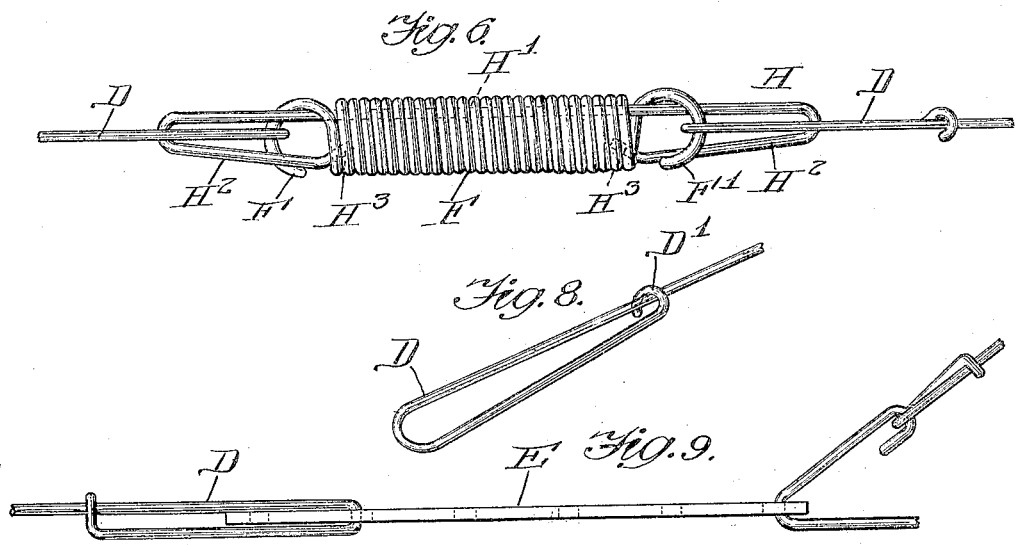
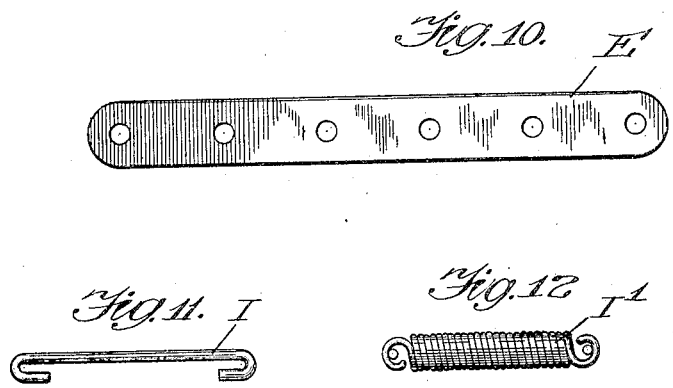

UNITED STATES PATENT OFFICE.

FRANCIS KARR, OF HOLLAND, MICHIGAN.

SPRING-SUPPORT.

No. 821,295.           Specification of Letters Patent.           Patented May 22, 1906.

Application filed March 23, 1905. Serial No. 251,623.

*To all whom it may concern:*

Be it known that I, FRANCIS KARR, a citizen of the United States, residing at Holland, in the county of Ottawa and State of Michigan, have invented certain new and useful Improvements in Spring-Supports, of which the following is a specification.

The object of my invention is to prevent the undue stretching of springs when subjected to strains that are greater than that which they are intended to undergo.

A further object is to provide such a form of support for wire mattresses, couches, &c., as will prevent the displacement of the parts and preserve at all times a uniform surface.

These and such other objects as may hereinafter appear are attained by the devices illustrated in the accompanying drawings, in which—

Figure 1 is a plan view of an embodiment of my invention applied to a bed. Fig. 2 is a plan view of an embodiment of my invention applied to a bed with wires under tension. Fig. 3 is a side elevation of Fig. 1. (See view on the line 3 3 of Fig. 2.) Fig. 4 is an enlarged side elevation of one end of Fig. 3, showing my limited helical spring and loop-guy. Fig. 5 is an enlarged side elevation of one end of Fig. 1, showing my limited helical spring and loop-guy in a reversed position. Fig. 6 is a side view of my limited helical spring and loop connection. Fig. 7 shows a modification of my limited helical spring having a limit-link integral therewith. Fig. 8 is a perspective view of the loop connection or eye. Fig. 9 is an enlarged side view of a portion of Fig. 1, showing the adjustment-strip in place. Fig. 10 is a plan view of the adjustment-strip. Fig. 11 is a side view of a clip; and Fig. 12 shows a modification of Fig. 11, the clip comprising a spring.

Like letters of reference indicate the same parts in the several figures of the drawings.

Referring by letter to the accompanying drawings, A represents the ends, and B the sides, of a mattress-frame, C the outer wires, and C' C² inner wires forming the mattress-support. These inner wires terminate at either end in loops or eyes D, having locking means D', connecting at one end with adjustment-strips E and at the other end with helical springs F. The outer wires C are preferably attached without the use of springs and stretched tightly, forming edges that are not so easily stretched as the inner portion of the support. The adjustment-strips and springs are secured to the end rails A by means of loop-guys G, and fitted within the springs F are limit-links H. I represents clips or links connecting adjacent wires of the mattress or support.

Referring to Fig. 6, the spring F terminates in a loop F', engaging the eye D. The limit-link H comprises in this figure a straight portion H' and loops H², with their ends H³ bent inwardly. This link fits inside the spring F. When the parts of the mattress or support are assembled, the limit-link H is located inside the spring F, with its loop ends extending beyond the loops F' of the spring F and within the eyes D and the loop-guys G.

In Fig. 7 I have illustrated a modification of my combined spring and link, in which one end of the spring *f* is turned in, forming a loop *f*³, and extended through the spring, forming a limit-link *f*², integral with the spring itself. The loop-guys G are first attached to the end rails, and to them are attached the adjustment-strips E at one end of the frame and the spring F at the other end, and adjacent wires, as C' C², are fastened together by means of the connecting-clips I, a modification of which in the form of a spring is shown in Fig. 12, as I'. The loop-guys terminate at one end in a loop G', engaging the hook G², formed from the other end.

In the modified form of loop-guy G (shown in Fig. 5, Sheet 1) the lower member extends horizontally on a level with the bottom of the end, terminating in a loop *g'*, engaging the eye *g*² on the end of the upper member. The loop-guy is reversible and is readily attached without the use of nails or other fastening means usually employed and when used in the position shown in Fig. 4 holds the support close to the mattress. When used in the position illustrated in Fig. 5, there is considerable space between the mattress and the support. Consequently the latter is not called into use to aid the mattress when the structure is used by children or only a light weight applied to its surface. The devices when used as a spring-support are first assembled as shown in Fig. 1.

The use of the adjustment-strip E allows the work to be done by boys or unskilled labor in fitting the parts together, as the wires are under no particular tension when first put in place. The use of the adjustment-strips also provides for adjusting the structure to accommodate different lengths. For instance, it is well known that springs for metal beds are somewhat longer than those used in wooden structures. After the wires are assembled the desired tension is secured by the use of the clip I or spring-clip I'. The greater the tension desired the greater the number of clips used.

It is a well-known fact that the greatest proportion of failures in wire mattresses and structures of like character is occasioned by the undue stretching of some of the parts. Especially is this true in cases where helical springs are used where by a sudden weight—such, for instance, as a person concentrating his entire weight on one spot—the spring is stretched beyond its resiliency, and consequently fails to return to its original position. Repeated acts of this character greatly impair the efficiency of the spring, and consequently that of the entire structure of which the spring forms part. Any device, therefore, that will prevent the undue stretching of the spring and will at the same time allow the free legitimate use of the same is one that will greatly prolong the life of all articles into which springs enter as a part of their construction.

In using my limit-link the spring is placed under the proper tension, and the length of the link is so adjusted that when the spring is extended to approximately the limit of its resiliency the ends of the loops of the links will prevent any further extension. The turned-in portions H³ serve to guide the loops within the circumference of the spring, and when the limit is reached the sides of the loops H² are within the spring, thus obviating any danger of opening the loops, they being automatically ferruled by the end coils of the spring. The tension under which the spring acts is so arranged that at no time will the limit be reached when the springs are subjected to ordinary use. When the limit is reached, if it be through the application of great strain suddenly applied the stopping of the spring may be in a degree sudden; but as this result only follows after the improper use of the spring it in no way impairs the value of the spring as an article of merchandise. I may, if I desire to do so, have the link consist of two or more parts and contain within itself means for adjusting its own length. Such a construction would obviously, however, considerably increase the cost of the spring and consequently limit its use, so I prefer the form illustrated in Figs. 4 and 5 as being a simpler and cheaper way of attaining the desired result, or I may, if I prefer, omit the springs on both ends of the wires and rely for resiliency upon the spring-clip I' or substitute for it the springs F, varying their number and position as desired.

While I have shown a construction in which limited springs are used at one end of the wires and adjustment-strips at the other end, I do not limit myself to these positions, as I may, if I desire, use springs on both ends of the wires or a spring and an adjustment-strip on the same end and vary the position of these members in any desired manner.

While I have illustrated several embodiments of my invention, it is obvious that other forms may be used without departing from the spirit of my invention.

I claim—

1. In an article of the class described, a detachable loop-guy in the form of a loop having two parallel sides of unequal length connected on an inclined side, one end of said loop being formed into a small loop on said inclined side and the other end being bent backwardly to form a part of said inclined side and having its extreme end formed into a loop adapted to detachably engage said small loop.

2. In an article of the class described, the combination with a spring, of means extending through said spring for limiting its extension, said means comprising an open link bent to form loops which project beyond said spring, each of said loops being formed with a shoulder tending to extend laterally beyond the coils of said spring, the free ends of said loops beyond said shoulder being projected inwardly.

3. The combination with a spring, of means extending through said spring for limiting its extension, said means comprising a link having one end thereof formed into a loop which projects longitudinally beyond said spring, part of said loop being bent so as to tend to extend laterally beyond said spring, the inner end of said loop being projected inwardly from said laterally-extending portion.

4. As a new article of manufacture, a spring-support, comprising a series of wires adjustably connected together by means of connecting-clips and secured to end pieces by means of loop-guys, said wires being attached to said loop-guys through the medium of loop-eyes, adjustment-strips, and limited springs.

5. As a new article of manufacture, a spring-support, comprising a series of wires adjustably connected together by means of connecting-clips and secured to end pieces by means of loop-guys, said wires being attached at one end to said loop-guys through the medium of loop-eyes and adjustment-strips, and at the other end through the medium of loop-eyes and a limited spring.

6. As a new article of manufacture, a spring-support, comprising a series of wires secured to end pieces by means of loop-guys, the outer wires being attached without the use of springs, the inner wires being attached to the ends through the medium of loop-eyes, adjustment-strips and limited springs.

7. In an article of the class described, a spring-support and a reversible loop-guy, comprising a member adapted to be passed around a retaining-piece, one end of said member extending horizontally beyond the retaining-piece and turned backwardly at an acute angle terminating in a hook adapted to engage a hook formed on the other end of the member.

8. As a new article of manufacture, a spring-support comprising a series of inner wires connected together, and outer wires connected to the adjacent wires by means of limited springs, said wires being secured to the end pieces through the medium of loop-guys, loop-eyes and adjustment-strips.

FRANCIS KARR.

Witnesses:
F. H. DRURY,
HERMAN EISENSCHMIT.